INVENTORS:
JOHN E. EDWARDS
BY ALEX RHODES
ATTORNEYS.

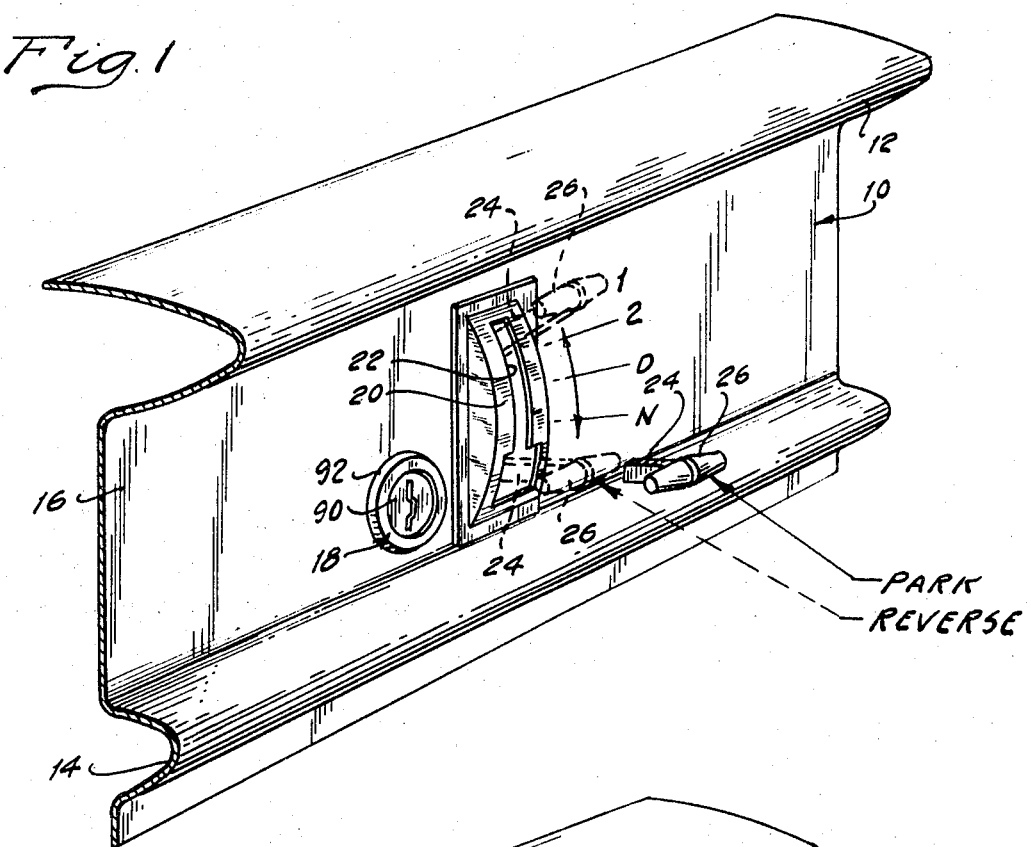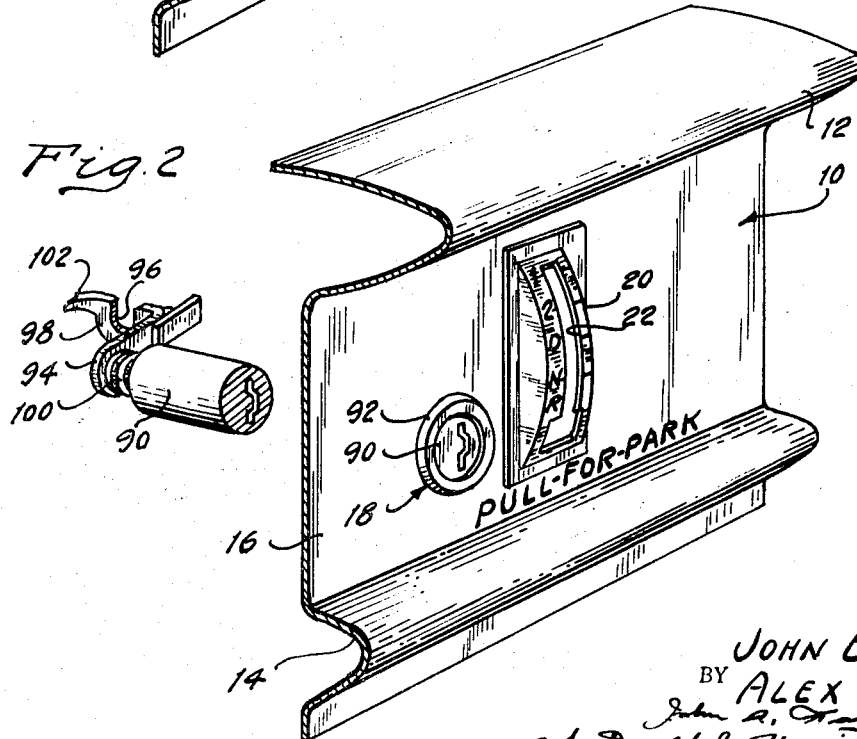

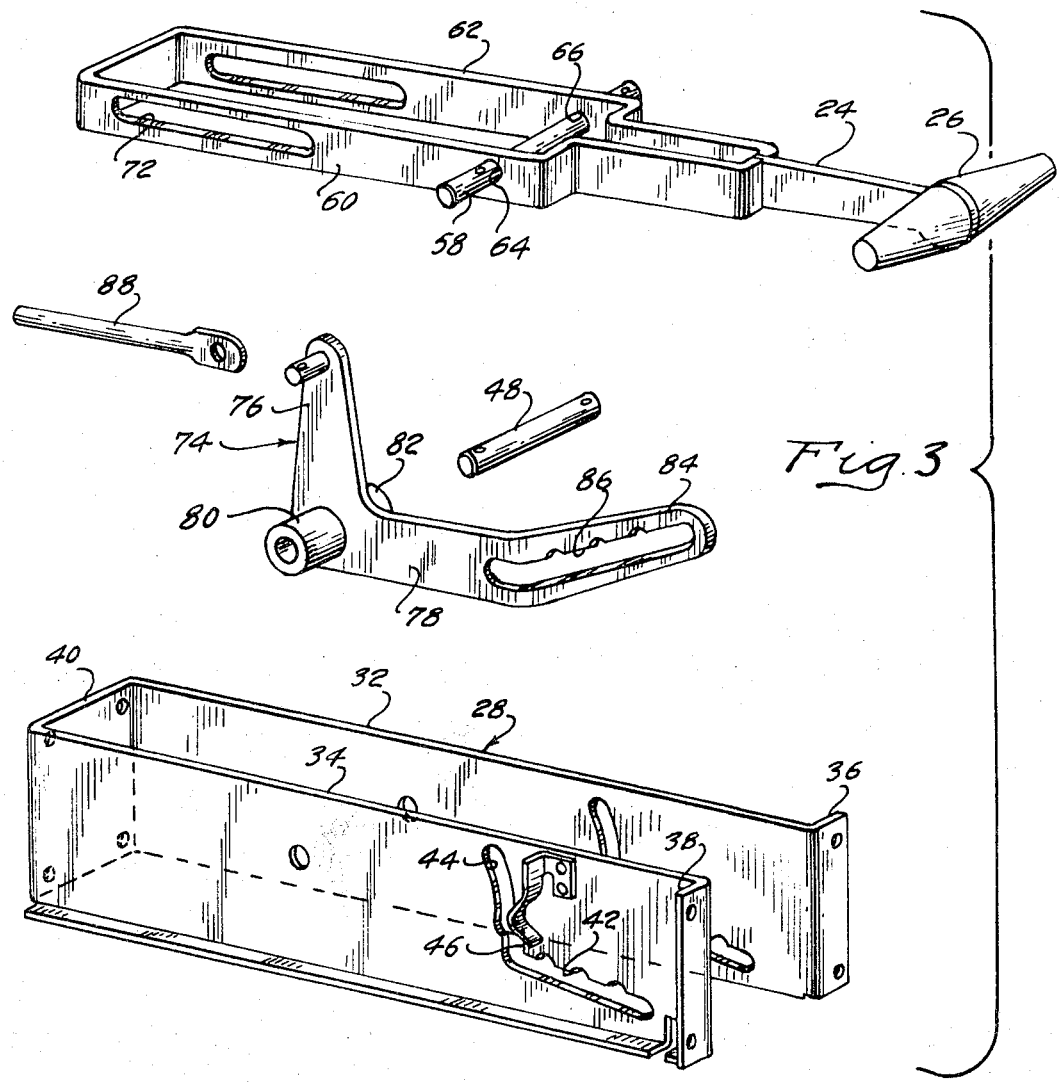

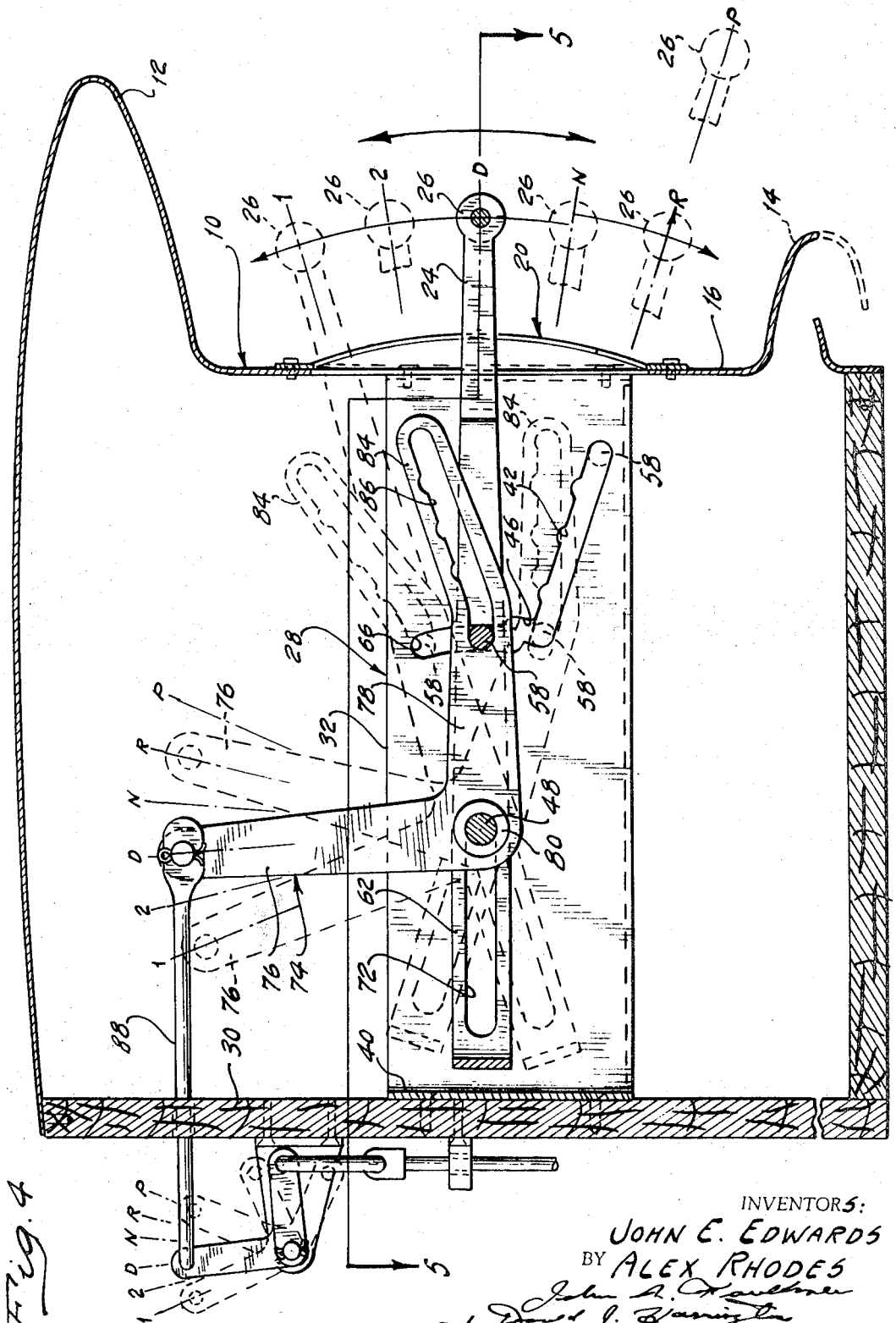

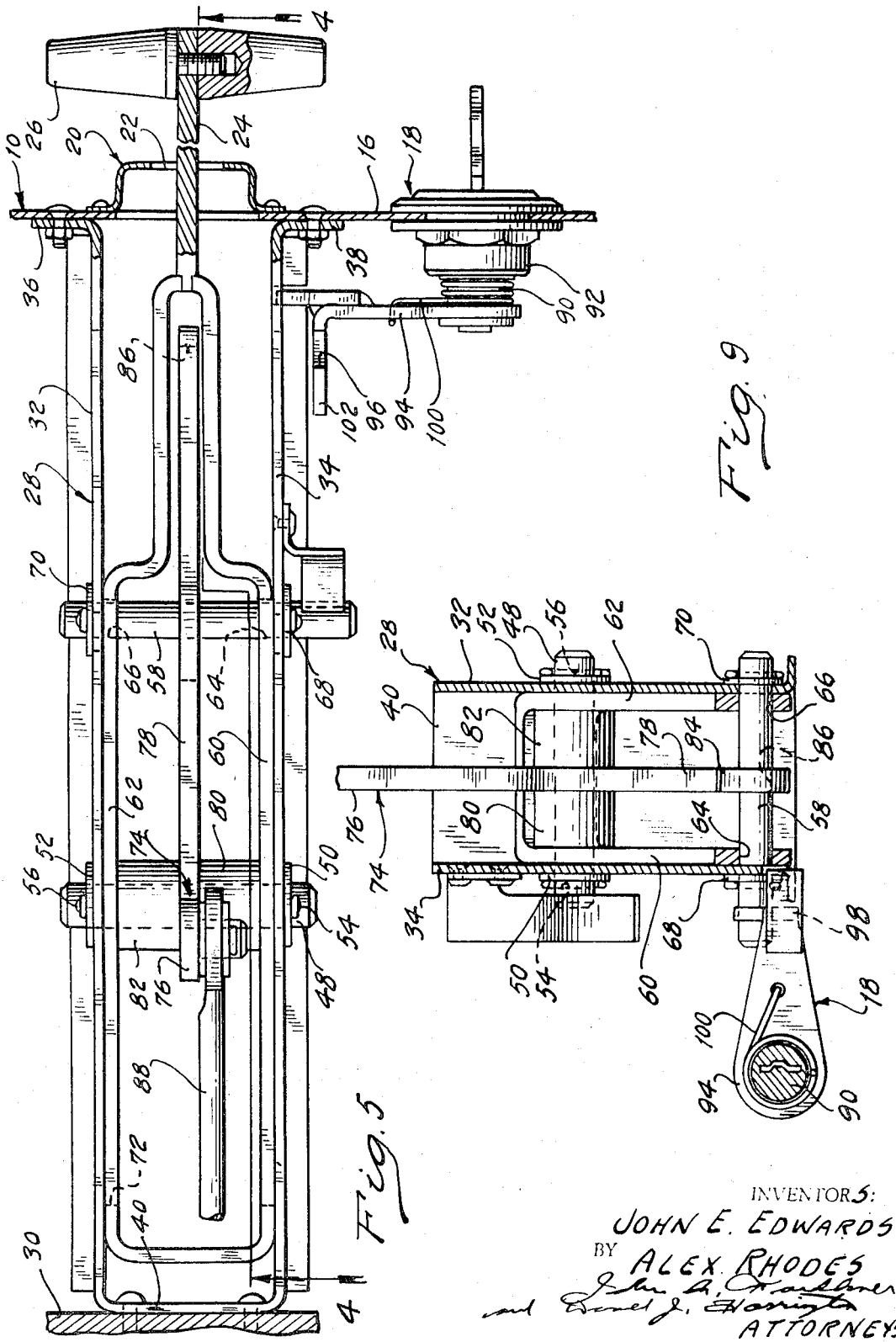

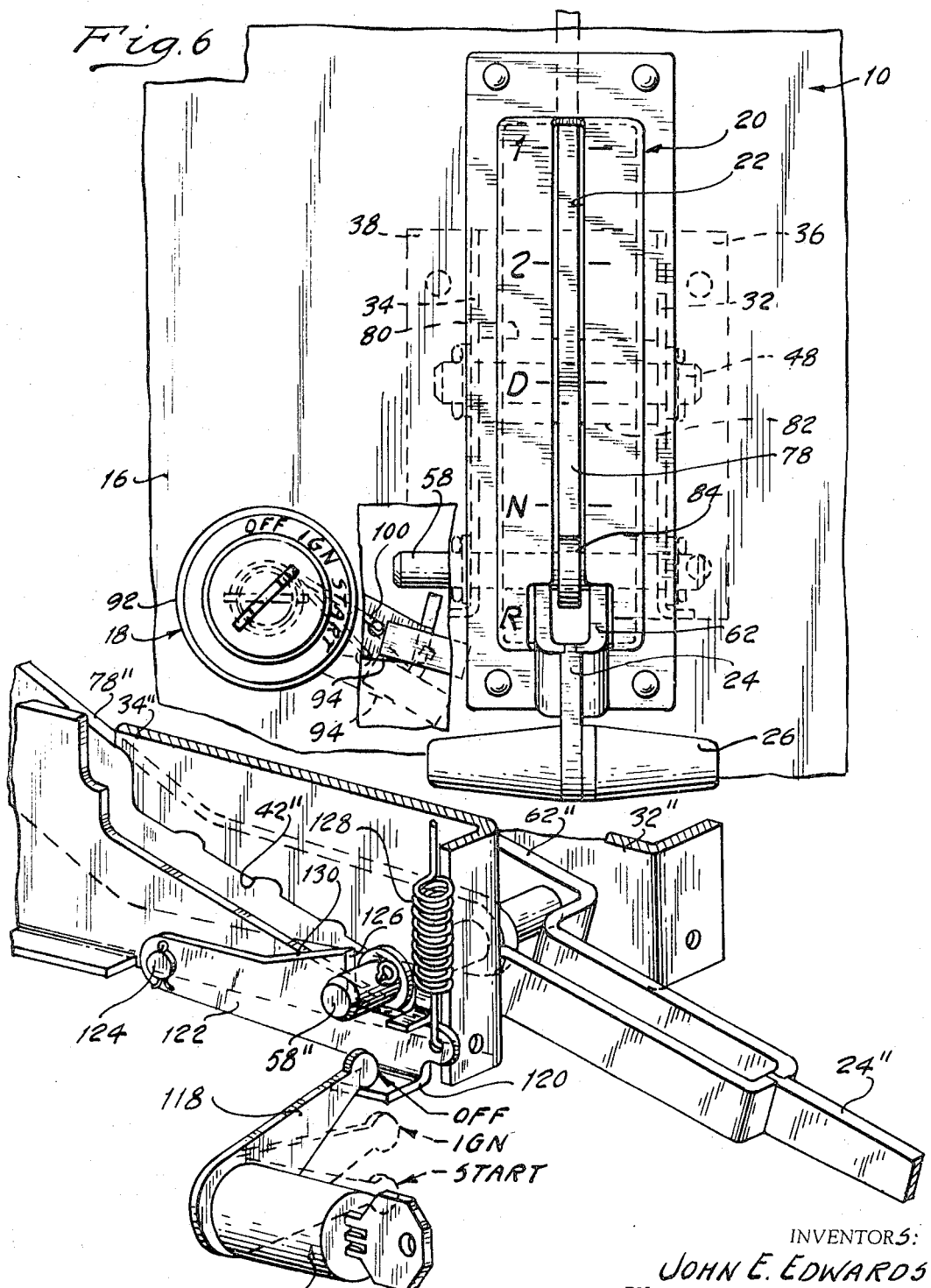

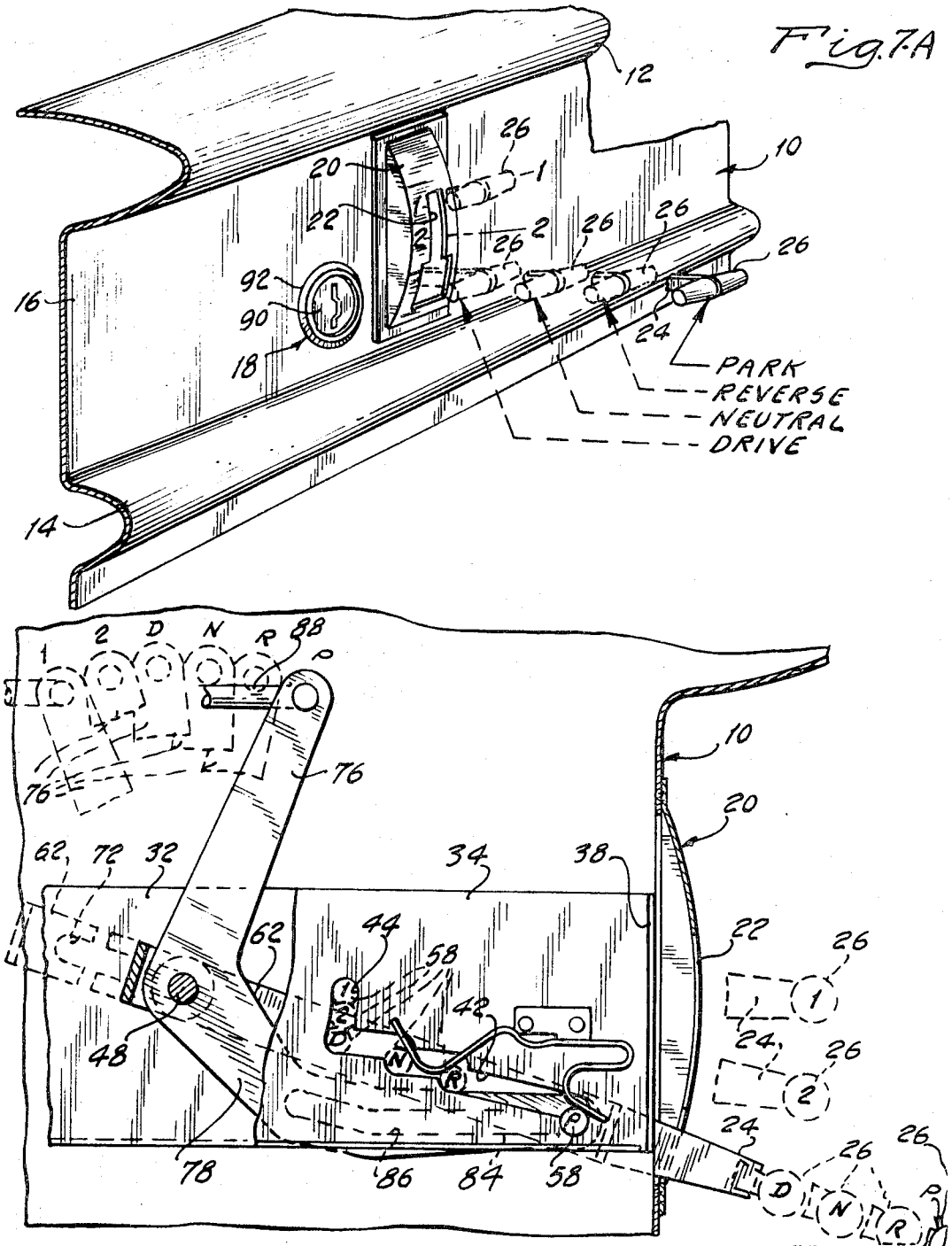

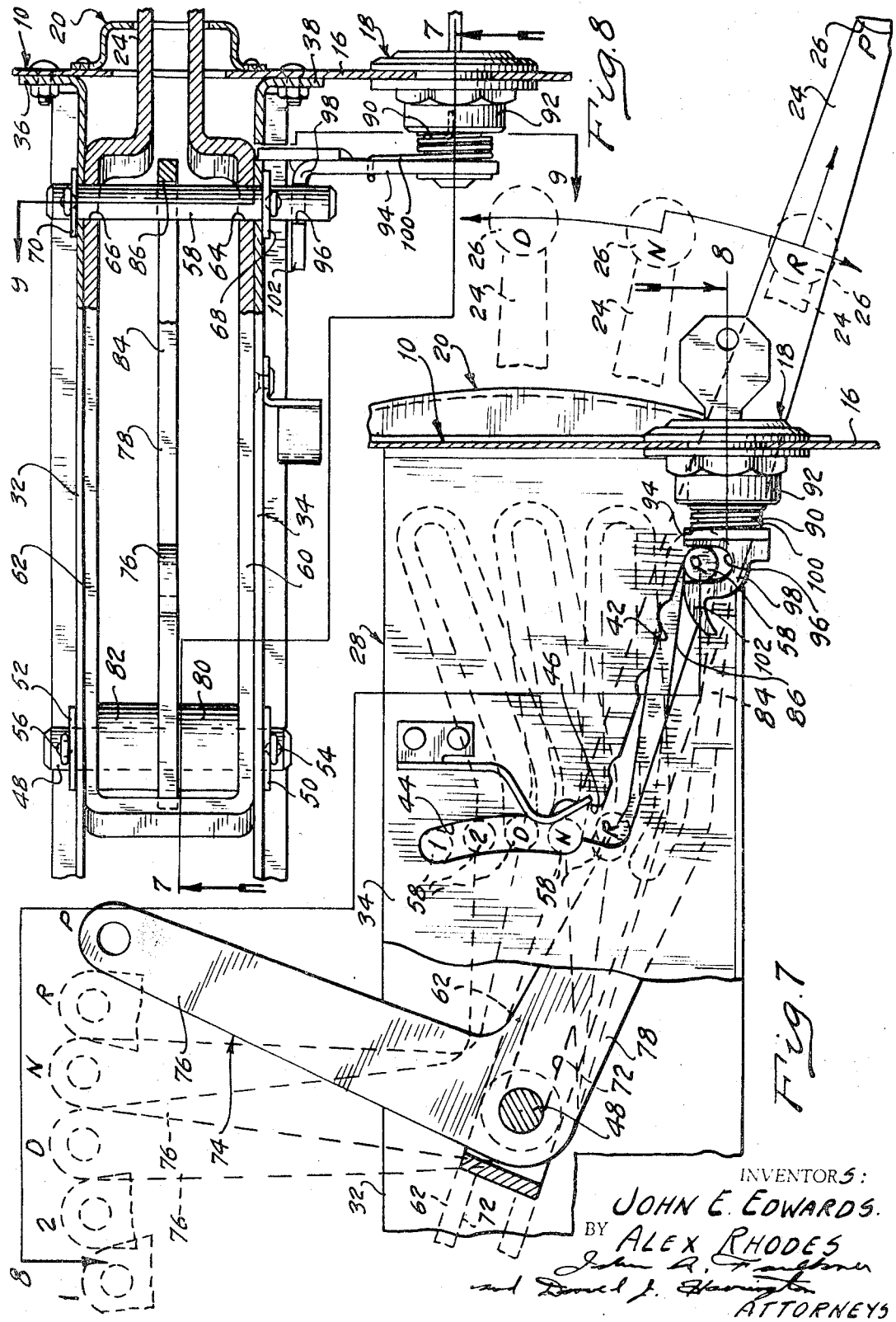

United States Patent Office 3,465,559
Patented Sept. 9, 1969

3,465,559
REMOTE TRANSMISSION CONTROL AND PARKING BRAKE APPARATUS FOR AUTOMOTIVE VEHICLES
Alex Rhodes, Detroit, Mich., and John E. Edwards, Windsor, Ontario, Canada, assignors to Ford Motor Company, Dearborn, Mich., a corporation of Delaware
Filed Aug. 9, 1967, Ser. No. 659,465
Int. Cl. B60r 25/06; E05b 65/12; G05g 9/02
U.S. Cl. 70—248   7 Claims

ABSTRACT OF THE DISCLOSURE

This specification describes an automotive transmission control linkage mechanism having a manually operated control lever for selecting various drive ranges in a multiple ratio automatic driveline and for applying and releasing a transmission parking brake. Each of these functions is accomplished with a separate motion pattern for the lever.

GENERAL DESCRIPTION OF THE INVENTION

Control linkage systems used in automotive vehicles for controlling the automatic transmission selector valve usually include a driver-operated control lever mounted within the passenger compartment of the vehicle on a steering column assembly that supports the steering wheel of the vehicle steering system. The lever includes several operating positions, each of which corresponds to a separate drive range of the automatic transmission. The lever is connected by a mechanical linkage to a pressure distributing range selector valve in the control valve body associated with the transmission mechanism.

Drivelines that employ automatic transmissions having a hydrokinetic torque converter or fluid coupling usually include a parking brake comprising a parking gear fixed to the transmission driven shaft and a parking pawl mounted on the relatively stationary transmission housing in such a way that it can be oscillated into and out of engagement with respect to the parking gear. The parking pawl is connected by means of a mechanical linkage to the driver-operated control lever so that it can be engaged when the lever is moved to a so-called "park" position. Normally the lever is moved from a so-called "neutral" position in one arcuate direction to condition it for operation in any one of several forward drive ranges. When the lever is shifted from the neutral position in the opposite direction, the transmission is conditioned for reverse drive operation. The park position of the control lever normally is displaced from the reverse position, and the lever must be moved in the aforesaid opposite direction through the reverse position in order to effect engagement of the parking brake.

The distance that the selector lever moves as it traverses the distance between the reverse position and the park position normally is equal to or only slightly greater than the distance that the lever moves as it traverses the distance between any other two operating positions. This limits the mechanical advantage of the linkage that connects the driver-operated control lever with the parking brake pawl. Because of this limitation in the mechanical advantage, considerable effort is required on the part of the operator to move the pawl into parking engagement and to remove it from the parking position. It is especially difficult to move the pawl from the parking position when the driven shaft of the transmission system is subjected to torque. This latter condition exists, for example, when the vehicle is parked on a grade.

It is an object of our invention to provide an improved parking brake linkage system which can be actuated by the operator with a minimum degree of effort both during pawl engagement and disengagement, and which provides also a normal mechanical advantage when the same control is used for selecting the various drive ranges of the automatic transmission.

Our invention includes a combined transmission ratio selector control and parking brake control for use in a vehicle driveline having an automatic power transmission wherein the driver-operated elements of the control are disassociated entirely from the vehicle steering column assembly. They may be mounted, for example, on the vehicle dash structure or on the floor structure in a console control arrangement.

The driver-operated elements of our invention are pivotally mounted for normal arcuate motion of the control lever about a fixed pivot point which will cause selective engagement of the various drive ranges of the transmission and wherein displacement of the control lever in a radial direction with respect to the pivotal axis of the lever will effect engagement and disengagement of the parking pawl to which the control lever is mechanically connected.

A safety lock for the driver-operated control element holds the driver-operated control lever fixed in the park position when the vehicle engine ignition switch is in a deenergized position, thus preventing inadvertent release of the parking brake when the vehicle is at rest.

BRIEF DESCRIPTION OF THE FIGURES OF THE DRAWINGS

FIGURE 1 shows in isometric form a portion of the dash structure for an automotive vehicle which supports the driver-controlled lever of our improved linkage system.

FIGURES 2 and 3 are exploded detailed views showing the relationship between structural elements of our improved linkage system.

FIGURE 4 is a longitudinal cross-sectional view of the vehicle dash structure showing the principal elements of our improved linkage system as seen from the plane of section line 4—4 of FIGURE 5.

FIGURE 5 is a plan view of the structure of FIGURE 4 as seen from the plane of section line 5—5 of FIGURE 4.

FIGURE 6 shows a lever-controlling gate mounted on the vehicle dash structure and the lock for preventing shifting movement of the lever from a park position when the vehicle is inactive.

FIGURE 7 shows the various operating positions for the FIGURE 4 structure as seen from the plane of section line 7—7 of FIGURE 8.

FIGURES 7A and 7B, which are related respectively to FIGURES 1 and 7, show an alternate embodiment of our invention having a different shift pattern.

FIGURE 8 is a partial sectional view taken along section line 8—8 of FIGURE 7.

FIGURE 9 is a cross-sectional view taken along section line 9—9 of FIGURE 8.

FIGURE 12 shows an alternate ignition lock for the control lever.

PARTICULAR DESCRIPTION OF THE INVENTION

Figure 10:
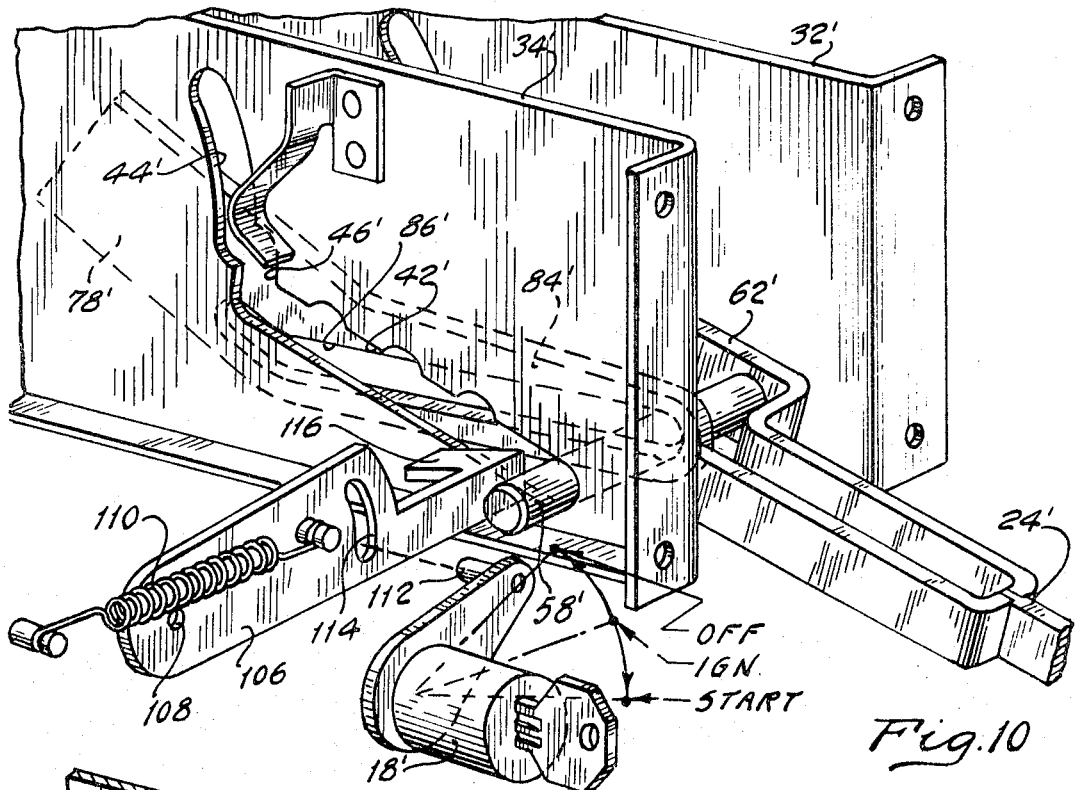
FIGURES 10 and 11 show an alternate construction having a spring detent construction and a safety lock for the control lever.

In FIGURE 1 numeral 10 designates generally a portion of the vehicle dash structure, sometimes referred to as the instrument panel, for a contemporary automotive vehicle passenger compartment. It includes deformable crash padding at 12 and 14 located below the windshield for the vehicle and extending across the frontal area of the vehicle passenger compartment. The dash structure includes a recessed panel 16 which is shrouded by the crash padding 12 and 14. Located in the panel 16 is an ignition switch 18 which can be turned to an "ignition on" position or an "ignition off" position in the usual fashion by a switch key.

Mounted also in panel 16 is a gate structure 20 having a vertical elongated slot 22 through which a shift lever 24 extends. The outer end of the lever 24 carries a handgrip 26.

The lever 24 can be moved by the operator to any one of several operating positions which are designated, respectively, by the symbols 1, 2, D, N and R.

In the cross-sectional view of FIGURE 4 there is shown a bracket 28 which extends from the panel 16 to the rear wall 30 of the dash structure. As seen in FIGURE 5, bracket 28 includes spaced parallel walls 32 and 34. The right ends of the walls 32 and 34 are flanged at 36 and 38 to permit welding to the panel 16 or to permit an attachment by bolts or rivets. The left-hand end of the bracket 28, as shown at 40, can be secured to the wall 30 by suitable fastening means such as bolts. Each of the walls 32 and 34 is formed with a cam slot having a first straight portion 42, a second arcuate portion 44 and a transient portion 46, the latter interconnecting the portions 42 and 44.

The center of curvature for the portion 44 is the axis of mounting pin 48 which extends through the walls 34 and 32 as indicated best in FIGURE 5. Pin 48 is held fast by flat washers 50 and 52 and by cooperating retainer pins 54 and 56. A guide pin 58 extends through the walls 34 and 32 and is adapted to register with the slot portions 44, 46 and 42 formed in each of these walls. Pin 58 extends also through a rectangular portion of the lever 24. This portion includes spaced parallel sides 60 and 62 having openings 64 and 66 which receive the pin 58. Flat washers 68 and 70, together with retainer pins, hold the pin 58 fast.

As best seen in FIGURE 4, the parallel sides 60 and 62 are slotted. As shown at 72, the pin 48 is received through these slots.

A bell crank 74 is pivoted on the pin 48. It is provided with a first arm 76 and a second arm 78. Spacers 80 and 82 are situated between the bell crank 74 and the spaced sides 60 and 62 of the lever 24. Arm 78 of the bell crank 74 includes an angularly offset part 84 which is formed with a straight slot 86 formed on the line that extends to one side of the axis of the pin 48.

The lever 24 can be moved about the pin 48 so that it can be positioned in any one of the operating positions that are shown in the drawing. As the lever 24 is moved by the operator, the pin 58 will be caused to move through the slot portion 44 about the axis of the pin 48. This pin is connected to the arm 78, as indicated best in FIGURE 5. Thus as the arm 24 is oscillated bell crank 74 also will be oscillated about the common center of pin 48.

As the pin 58 travels through the arcuate slot portion 44, the lever 24 assumes either the low speed ratio position 1, the intermediate speed ratio position 2, the normal automatic drive ratio position D or the neutral position N. When the lever 24 is adjusted to position N, pin 58 engages the shoulder formed by the discontinuity between the slot portions 44 and 46. In order to adjust the lever 24 to the reverse position R, the operator must pull on the hand-grip 26 until the pin 58 registers with slot portion 46. After this is done, the lever 24 can be moved to the R position. The shoulder at the discontinuity between the slot portions 44 and 46 prevents inadvertent movement of the lever 24 to the reverse position when reverse drive is not desired.

To effect movement of the lever 24 to the park position, it merely is necessary for the operator to pull on the hand-grip 26 of the lever 24. When this is done, the pin 58 will traverse the extent of the slot portion 42. As this is done, the bell crank 74 will move from the position that is assumed during neutral to a position corresponding to park. As the pin 58 traverses the slot portion 86 of the arm 78, camming action is established between the slot 86 and the pin 58. The mechanical advantage that exists between the lever 24 and the bell crank 74 as the bell crank 74 is moved from the neutral position to the R position is substantially greater because of this camming action than the corresponding mechanical advantage that exists between these two parts when the bell crank lever 74 moves arcuately between the number 1 position and the reverse position R.

The extended end of the arm 76 of the bell crank is connected mechanically through the linkage, shown in part at 88, to the transmission ratio controlling manual selector valve.

As the operator pulls the lever 24 from the reverse position R to the park position P, the pin 48 moves through the slot 72 formed in the sides 60 and 62 of the lever 24.

When the lever 24 is to the park position, the operator may lock the lever in that position by turning the ignition switch to the "off" position.

The ignition switch 18 comprises a lock cylinder 90 rotatably within a barrel 92. Secured to the end of the cylinder 90 is a lever 94 which has formed thereon a projection 96. Carried by the lever 94 is a latch 98 which is adapted to rotate about the centerline of the cylinder 90. The lever 94 is connected to cylinder 90 by means of a spring 100 which normally tends to cause the latch 98 to move upwardly. The extended end of the latch carries a ramp 102 which is adapted to be engaged by the pin 58 if the lock barrel 90 is moved to an off position prior to movement of the lever 24 to the park position. The pin 58 will cam against the ramp 102, thereby depressing the lever 94. After the pin 58 is positioned, as shown in FIGURE 4, the ramp 102 will snap to the position shown in FIGURE 4, thereby locking the pin 58 against movement out of the park position.

When the ignition switch lock cylinder 90 is moved to the ignition "on" position, the lever 94 moves away from the pin 58 as indicated in FIGURE 6. This permits the lever 24 to be returned to the reverse position and then to any one of the other operating positions.

The ignition switch lock thus is capable of preventing movement of the lever 24 out of the park position when the adjacent switch is in the "off" position. It is possible, however, to move the lever 24 into the park position regardless of whether the ignition switch is off or on.

In FIGURES 7A and 7B we have illustrated an alternate shift lever pattern. In this instance reverse position of the lever is obtained by withdrawing the shifting lever through the gate opening 22 to a position intermediate the drive position and the park position. Location of the reverse position can be defined by suitable detent as seen in FIGURE 7B. Neutral position can be located by means of another detent between the drive position and the reverse position.

The N position, the R position and the P position are obtained as the pin 58 moves along slot 86.

Our improved gear shift mechanism makes it possible to employ a more efficient linkage between the driver-controlled lever and the transmission. It also makes possible a greater degree of flexibility in locating the transmission control within the vehicle passenger compartment. This is due to the separation of the transmission control elements from the steering column assembly.

Figure 11:
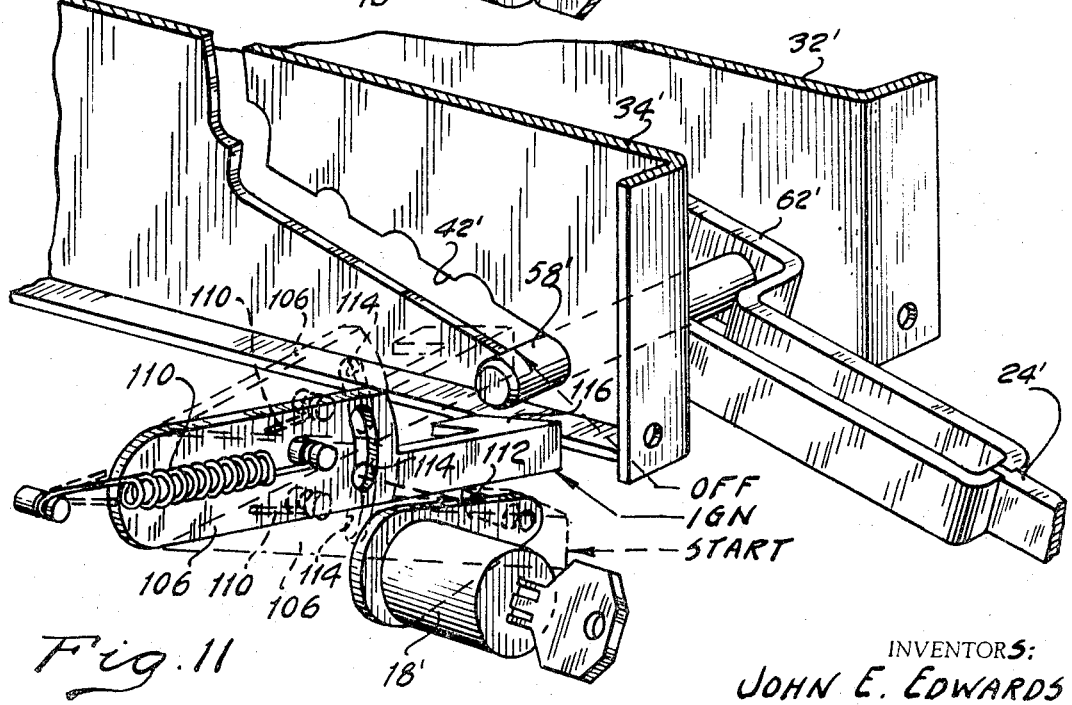

In FIGURES 10 and 11 we have shown an alternate ignition switch lock for the embodiment of FIGURES 7A and 7B. The elements of FIGURES 10 and 11 that are common to the construction of FIGURES 7A and 7B have been shown by similar reference characters, but prime notations are added.

The ignition switch 18′ of FIGURE 10, carries a lever 104 which is adapted to engage a lever 106 when it is moved to the "off" position. Lever 106 is pivoted at 108 and is held in either one or the other of two arcuate positions by an overcenter spring 110. Lever 106 has a stem 112 that is received in arcuate slot 114 in lever 106.

When lever 106 is in the locking position, it engages pin 58′ after the latter assumes the park position. Lever 106 has a ramp 116 to permit the pin 58 to ride over lever 106 to the park position when the ignition switch is "off."

FIGURE 11 shows the same elements as FIGURE 10, but the ignition lock is in the released position.

The FIGURE 12 construction is similar to that of FIGURES 10 and 11, and corresponding reference characters have been used, but double prime notations are added. The ignition lock of FIGURE 12, however, includes a lever 118 carried by the switch barrel. This engages a projection 120 on a lever 122, which is pivoted at 124 on side wall 34″. A shoulder 126 engages pin 58″ as lever 122 is moved upwardly by spring 128. Ramp 130 depresses lever 122 or pin 58″ rides over it upon movement of lever 24″ to the park position when the ignition switch 18″ is in the "off" position. Lever 122 assumes a release position when the switch 18 is in the "on" position.

Having thus described preferred forms of our invention, what we claim and desire to secure by U.S. Letters Patent is:

1. A personally operable control for selecting speed ratios in a multiple speed ratio, torque delivery, driveline for an automotive vehicle comprising a mounting bracket having a side wall, a first personally operable control lever pivotally mounted on said bracket for rotation about an axis that is transverse to the plane of said wall, a second lever mounted for rotation about an axis that is common to the axis of rotation of said first lever, a mechanical connection between said second lever and ratio controlling elements of said driveline, a pin and slot connection between said levers including a guide pin carried by one lever and a slot formed in the other lever with the pin received through said slot, said levers being adapted to rotate together in unison when said first lever is moved arcuately about its axis, and a guide slot formed in said wall including first and second portions situated in angular relationship and intersecting at a common point, said guide slot in said side wall extending in a direction away from said common axis, said guide pin extending through said slot thereby establishing a camming action between said guide pin and said bracket, said second lever being moved to a final extended position as the first lever is withdrawn through said guide slot in a direction that increases the distance between the oscillating axis of said first lever and said pin.

2. The combination as set forth in claim 1 wherein the means for mounting said first lever and said second lever for rotation about a common axis includes a mounting pin extending through said wall, a second guide slot formed in said first lever, a driveline parking brake connected to said mechanical connection, said mounting pin supporting said second lever and received through said second guide slot whereby said mounting pin is drawn through said second guide slot as said first lever is withdrawn to actuate said parking brake.

3. A personally operable control for selecting speed ratios in a multiple speed ratio torque delivery driveline for an automotive vehicle comprising a mounting bracket having a side wall, a personally operable control lever pivotally mounted on said bracket for rotation about an axis that is transverse to the plane of said wall, a second lever mounted for rotation about an axis that is common to the axis of rotation of said first lever, a mechanical connection between said second lever and ratio controlling elements of said driveline and between said second lever and a parking brake, a pin and slot connection between said levers including a pin carried by one lever and a slot formed in the other lever with the pin received through said slot, said levers being adapted to rotate together in unison when said first lever is moved arcuately about its axis, a guide slot formed in said wall including first and second portions situated in angular relationship and intersecting at a common point, said second lever being moved to a final position corresponding to a parking brake actuating position as the first lever is withdrawn through said guide slot in a direction that increases the distance between the oscillating axis of said first lever and said pin, a manually operated ignition switch mounted adjacent said first lever, a locking member carried by said ignition switch, said locking member being movable into engagement with said pin when said ignition switch is in an off position.

4. A personally operable control for selecting speed ratios in a multiple speed ratio torque delivery driveline for an automotive vehicle comprising a mounting bracket having a side wall, a personally operable control lever pivotally mounted on said bracket for rotation about an axis that is transverse to the plane of said wall, a second lever mounted for rotation about an axis that is common to the axis of rotation of said first lever, a mechanical connection between said second lever and ratio controlling elements of said driveline and between said second lever and a parking brake, a pin and slot connection between said levers including a pin carried by one lever and a slot formed in the other lever with the pin received through said slot, said levers being adapted to rotate together in unison when said first lever is moved arcuately about its axis, a guide slot formed in said wall including first and second portions situated in angular relationship and intersecting at a common point, said second lever being moved to a final position corresponding to a parking brake applying position as said first lever is withdrawn through said guide slot part in a direction that increases the distance between the oscillating axis of said first lever and said pin, a manually operated ignition switch mounted adjacent said first lever, a locking member carried by said ignition switch, said locking member being movable into engagement with said pin when said ignition switch is in an off position, said locking member comprising spring means for resisting motion of said locking member, a cam carried by said locking member which is engageable by said pin to allow said locking member to move when said pin is advanced to a park position when said ignition switch is off.

5. A personally operable control for selecting speed ratios in a multiple speed ratio, torque delivery, driveline, for an automotive vehicle comprising a mounting bracket having a side wall, a first personally operable control lever pivotally mounted on said bracket for rotation about an axis that is transverse to the plane of said wall, a second lever mounted for rotation about an axis that is common to the axis of rotation of said first lever, a mechanical connection between said second lever and ratio controlling elements of said driveline, a pin-and-slot connection between said levers including a guide pin carried by one lever and a slot formed in the other lever with the pin received through said slot, said levers being adapted to rotate together in unison when said first lever is moved arcuately about its axis, and a guide slot formed in said wall including first and second portions situated in angular relationship and intersecting at a common point, said second lever being moved to a final extended position as the first lever is withdrawn through said guide slot in a direction that increases the distance between the oscillating axis of said first lever and said pin, the slot of said pin-and-slot connection being formed in said second lever and extended along a line of action that is displaced from the oscillatory axis of said second lever whereby the mechanical advantage of said levers is increased as said first lever is withdrawn when compared to the mechanical advantage of said levers when said first lever is arcuately moved about its axis.

6. A personally operable control for selecting speed ratios in a multiple speed ratio, torque delivery, driveline for an automotive vehicle comprising a mounting bracket having a side wall, a first personally operable control lever pivotally mounted on said bracket for rotation about an axis that is transverse to the plane of said wall, a second lever mounted for rotation about an axis that is common to the axis of rotation of said first lever, a mechanical connection between said second lever and ratio controlling elements of said driveline, a pin-and-slot connection between said levers including a guide pin carried by one lever and a slot formed in the other lever with the pin received through said slot, said levers being adapted to rotate together in unison when said first lever is moved arcuately about its axis, a guide slot formed in said wall including first and second portions situated in angular relationship and intersecting at a common point, said second lever being moved to a final extended position as the first lever is withdrawn through said guide slot in a direction that increases the distance between the oscillating axis of said first lever and said pin, the slot of said pin-and-slot connection being formed in said second lever and extended along a line of action that is displaced from the oscillatory axis of said second lever whereby the mechanical advantage of said levers is increased as said first lever is withdrawn when compared to the mechanical advantage of said levers when said first lever is arcuately moved about its axis, the means for mounting said first lever and said second lever for rotation about said common axis including a mounting pin supported by said wall, a second guide slot formed in said first lever, and a driveline parking brake connected to said mechanical connection, said mounting pin supporting said second lever and being received through said second guide slot whereby said mounting pin is drawn through said second guide slot as said first lever is withdrawn to actuate said parking brake.

7. A personally operable control for selecting speed ratios in a multiple speed ratio, torque delivery, driveline for an automotive vehicle comprising a mounting bracket having a side wall, a first personally operable control lever pivotally mounted on said bracket for rotation about an axis that is transverse to the plane of said wall, a second lever mounted for rotation about an axis that is common to the axis of rotation of said first lever, a mechanical connection between said second lever and ratio controlling elements of said driveline, a pin-and-slot connection between said levers including a guide pin carried by one lever and a slot formed in the other lever with the pin received through said slot, said levers being adapted to rotate together in unison when said first lever is moved arcuately about its axis, a guide slot formed in said wall including first and second portions situated in angular relationship and intersecting at a common point, said second lever being moved to a final extended position as the first lever is withdrawn through said guide slot in a direction that increases the distance between the oscillating axis of said first lever and said pin, the slot of said pin-and-slot connection being formed in said second lever and extended along a line of action that is displaced from the oscillatory axis of said second lever whereby the mechanical advantage of said levers is increased as said first lever is withdrawn when compared to the mechanical advantage of said levers when said first lever is arcuately moved about its axis, the means for mounting said first lever and said second lever for rotation about said common axis including a mounting pin supported by said wall, a second guide slot formed in said first lever, a driveline parking brake connected to said mechanical connection, said mounting pin supporting said second lever and being received through said second guide slot whereby said mounting pin is drawn through said second guide slot as said first lever is withdrawn to actuate said parking brake, a manually operated ignition switch mounted adjacent first lever, and a locking member carried by said ignition switch, said locking member being adapted to move into engagement with said guide pin when said ignition switch is in an off position.

References Cited
UNITED STATES PATENTS 2,926,762   3/1960   Edgley _____ 192—4

MARVIN A. CHAMPION, Primary Examiner

R. L. WOLFE, Assistant Examiner

U.S. Cl. X.R.

70—254; 74—471, 473